United States Patent
Chen et al.

(10) Patent No.: US 6,771,497 B2
(45) Date of Patent: Aug. 3, 2004

(54) HEAT DISSIPATION APPARATUS

(75) Inventors: Wen-Hsiang Chen, Taipei Hsien (TW); Jung-Wen Chang, Taoyuan Hsien (TW)

(73) Assignee: Quanta Computer, Inc., Taoyuan Hsien (TW)

( * ) Notice: Subject to any disclaimer, the term of this patent is extended or adjusted under 35 U.S.C. 154(b) by 0 days.

(21) Appl. No.: 10/247,239

(22) Filed: Sep. 19, 2002

(65) Prior Publication Data

US 2004/0057205 A1 Mar. 25, 2004

(51) Int. Cl.[7] .................................................. G06F 1/20
(52) U.S. Cl. ....................... 361/687; 361/695; 361/700; 165/80.3; 165/122; 174/15.2; 62/259.2; 415/178; 415/241.1
(58) Field of Search .................................. 361/687, 689, 361/699, 700, 695, 697; 265/80.3, 80.4, 104.33, 185, 120–126; 174/15.2; 415/172, 178, 213.1, 214.1; 62/259.2

(56) References Cited

U.S. PATENT DOCUMENTS

| | | | | |
|---|---|---|---|---|
| 5,848,282 A | * | 12/1998 | Kang ........................... | 361/695 |
| 6,043,980 A | * | 3/2000 | Katsui .......................... | 361/695 |
| 6,122,169 A | * | 9/2000 | Liu et al. ...................... | 361/695 |
| 6,311,767 B1 | * | 11/2001 | Inoue et al. ................. | 165/80.3 |
| 6,328,097 B1 | * | 12/2001 | Bookhardt et al. .......... | 361/687 |
| 6,351,382 B1 | * | 2/2002 | Nakanishi et al. ........... | 361/695 |
| 6,487,076 B1 | * | 11/2002 | Wang ........................... | 361/687 |

* cited by examiner

*Primary Examiner*—Lisa Lea-Edmonds
(74) *Attorney, Agent, or Firm*—Thomas, Kayden, Horstemeyer & Risley

(57) ABSTRACT

A heat dissipation apparatus for a notebook computer with a desktop central processing unit is described. The heat dissipation apparatus has a heat pipe, a first heat exchanger, a first fan, a second heat exchanger, and a second fan. The heat pipe couples with the desktop central processing unit to absorb heat therefrom. The first heat exchanger couples with the heat pipe directly above the desktop central processing unit. The first fan blows on the first heat exchanger to remove internal heat. The second heat exchanger couples with the heat pipe to absorb the residual heat from the heat pipe and the second fan blows on the second heat exchanger to remove the residual heat. The second fan starts working when the internal temperature of the notebook computer is too high. Both the first fan and second fan comprise two inlets respectively, and therefore the cold air is from both inside and outside of the notebook computer.

17 Claims, 3 Drawing Sheets

HEAT DISSIPATION APPARATUS

FIELD OF THE INVENTION

The present invention relates to a heat dissipation apparatus and especially to a heat dissipation apparatus for a notebook computer with a desktop central processing unit.

BACKGROUND OF THE INVENTION

Information technology and computer industrial are highly developed now. Portable devices, such as notebook computers, are popularly utilized for business or any other purpose. The portable devices have become lighter, thinner and smaller to satisfy the requirements of modern environments. Notebook computers are popularly used by the public, because of the powerful processing capacity of digital information and lower prices.

Due to improvements in the semiconductor process technology, the weight and the size of a notebook computer are lighter and smaller. Since the notebook computer function is more powerful, the integrated circuits of central processing unit (CPU) thereof become more complex. The complex integrated circuits cause serious heat dissipation problems. The problem of heat dissipation is more serious for notebook computers than for other personal computers. If a heat dissipation problem exists, the internal temperature of the notebook computer increases. As the internal temperature of the notebook computer increases, the operation system thereof may become unstable. Therefore, the notebook computer could crash. More seriously, the hardware thereof could be damaged.

At present, some of notebook computers utilize desktop CPUs. The first reason is to reduce the price of the notebook computer. The second reason is to launch a notebook computer to the market in time. Normally, the launch time of desktop CPU is earlier than a mobile CPU specifically for a notebook computer. Hence, if the notebook computer uses the desktop CPU, the price of the notebook is lower and the launch time is earlier.

Installation of a desktop CPU in a notebook computer causes a more serious heat dissipation problem. The solution of the serious heat dissipation problem is to use more than two heat pipes in the notebook computer to reduce the temperature of the CPU efficiently. However, the heat pipe is expensive and the internal temperature is still too high because the CPU temperature sometimes rises too quickly.

SUMMARY OF THE INVENTION

One object of the present invention is to reduce the internal temperature of a notebook computer with a desktop CPU.

Another object of the present invention is to reduce the cost of the notebook computer with a desktop CPU.

The present invention provides a heat dissipation apparatus for a notebook computer with a desktop central processing unit. The heat dissipation apparatus comprises a heat pipe, a first heat exchanger, a first fan, a second heat exchanger, and a second fan. The heat pipe is disposed on the desktop central processing unit to absorb heat produced by the desktop central processing unit. The first heat exchanger couples with the heat pipe directly above the desktop central processing unit to absorb part of the heat from the heat pipe. The first fan is coupled with the heat pipe and the first heat exchanger to blow the first heat exchanger so as to take part of the heat out of the notebook computer. The second heat exchanger couples with the heat pipe to absorb the residual heat from the heat pipe. The second fan is coupled with the second heat exchanger to blow the second heat exchanger so as to take the residual heat out of the notebook computer.

Further, the first heat exchanger and the second heat exchanger comprise a heat sink which is made of the high thermal conductivity material, such as copper. The heat pipe is also made of the high thermal conductivity material, such as copper. The second fan works when an internal temperature of the notebook computer is higher than a predetermined temperature.

Furthermore, the first fan and second fan comprise two inlets respectively. The distribution rates of the inlet cold air are about 20% to 30% cold air from the inside of the notebook computer and about 70% to 80% cold air from the outside of the notebook computer.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

Figure 1:
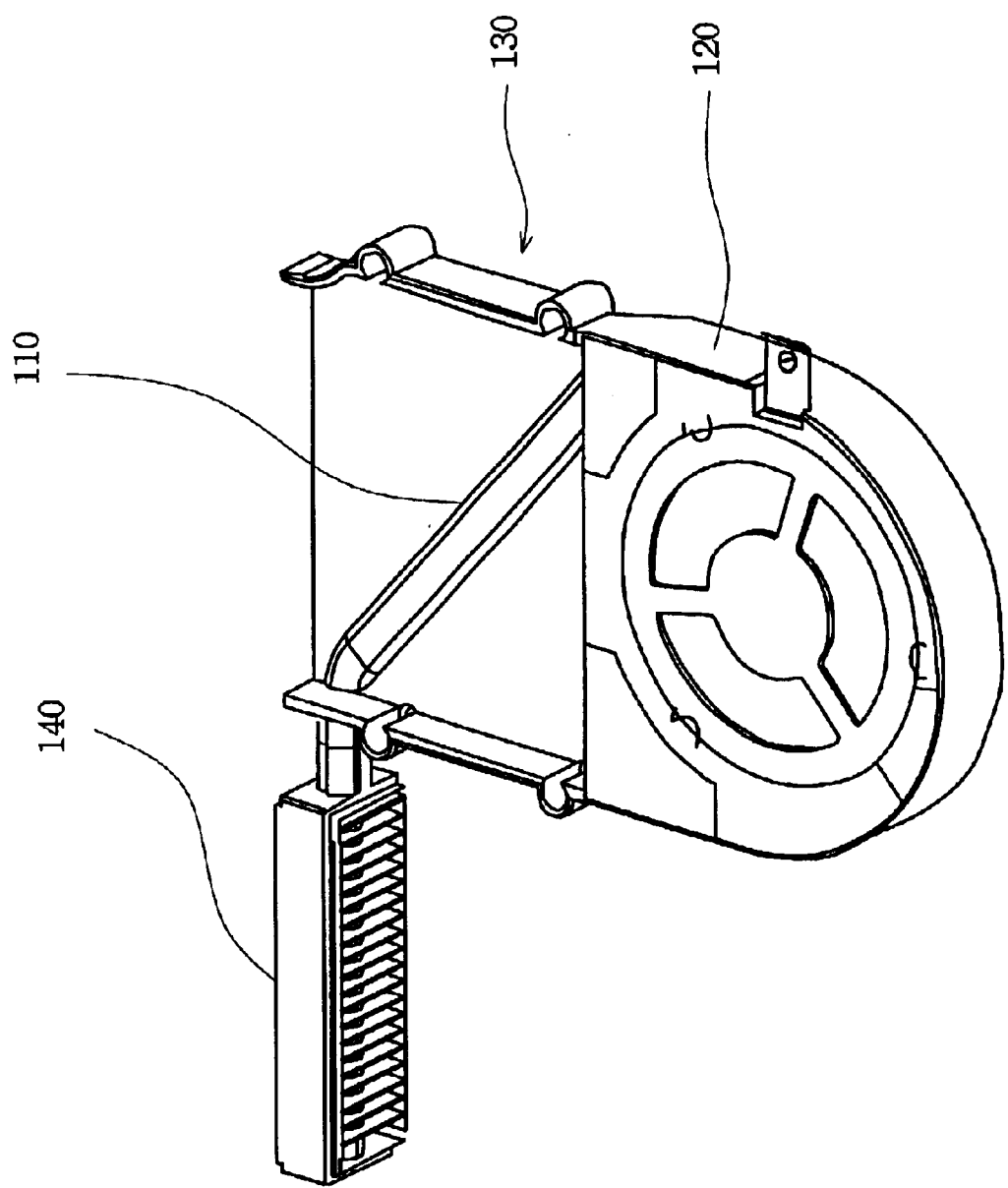
FIG. 1 is a detailed partial diagram of one embodiment according to the present invention to show the layout of the heat pipe.

FIG. 1 is a detailed partial diagram of one embodiment according to the present invention. The diagram leaves out a first heat exchanger and a second heat exchanger to show the layout of a heat pipe according to the present invention more detail. Due to an excessive CPU temperature from a desktop CPU, the system may unstable or the hardware may suffer damage. The conventional notebook computer utilizes more than one heat pipe to reduce the temperature of the CPU, especially a desktop CPU. The cost of the notebook computer correspondingly increases since the heat pipe is an expensive device for a notebook computer. There is a need to enhance the cooling efficient of the heat dissipation apparatus and reduce the quantity of the heat pipes. The embodiment according to the present invention utilizes only one heat pipe 110 over the CPU 130 to take out the heat produced by the CPU. A first fan 120, such as a blower-type fan, is coupled with the heat pipe 110 to take away the heat from the notebook computer. As shown in FIG. 1, the first fan 120 is disposed behind the heat pipe 110 and coupled with the heat pipe 110. The heat pipe 110 is coupled with a second heat exchanger 140 to deliver the residual heat thereto.

Figure 2:
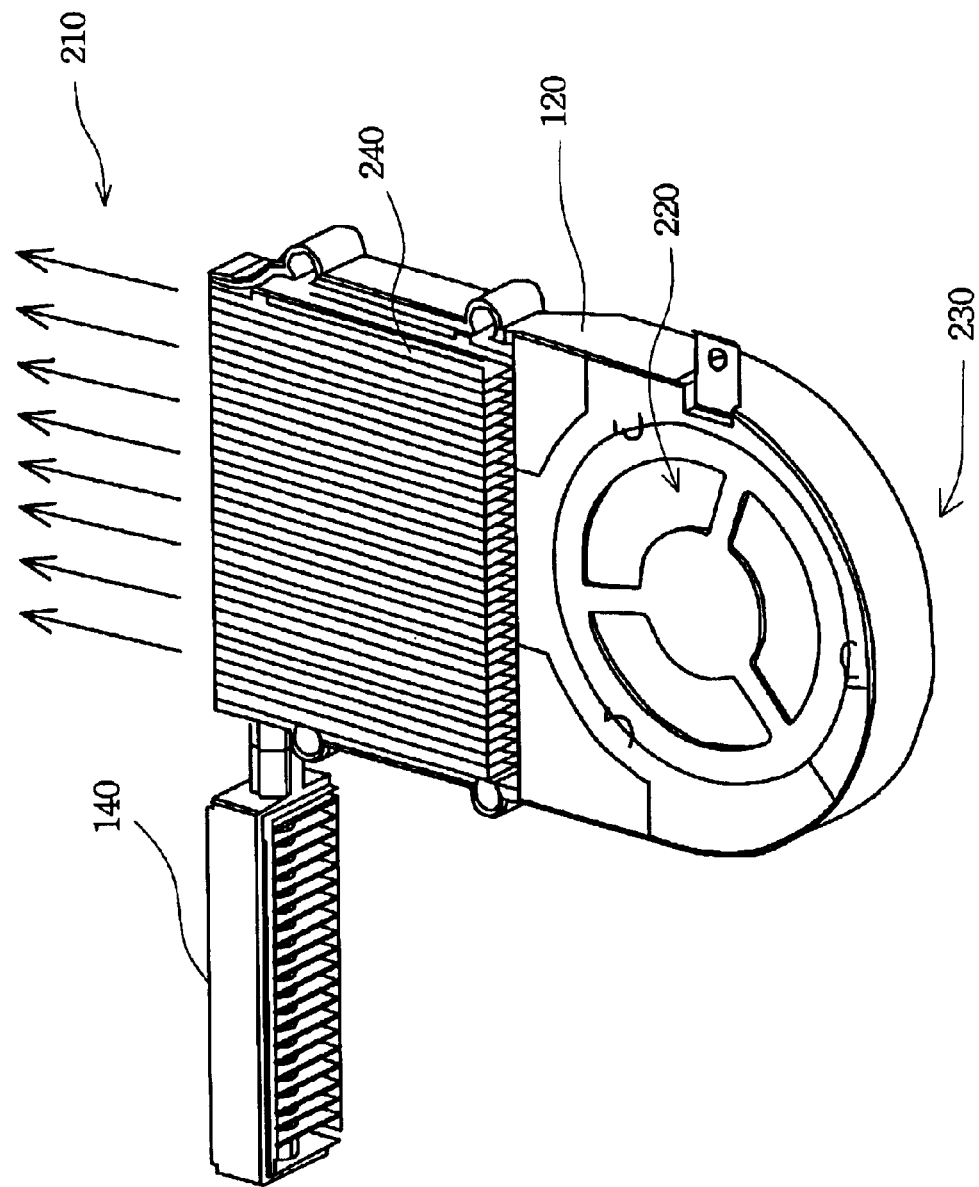
FIG. 2 is a detailed partial diagram of the apparatus in FIG. 1 with a first exchanger according to the present invention.

FIG. 2 a detailed partial diagram of the apparatus in FIG. 1 coupled with a first heat exchanger according to the present invention. The first heat exchanger 240, disposed directly above the CPU 130, is coupled with the first fan 120 and removes heat from the heat pipe 110 and the CPU 130. As shown in FIG. 2, the first heat exchanger 240 is disposed in front of the first fan 120 and coupled with the first fan 120.

When the heat is transferred to the first heat exchanger 240, the first fan 120 blows the first heat exchanger 240, and then the heat is brought out of the notebook computer via hot air 210. The first fan 120 employs two inlets to draw the cold air from the inside and the outside of the notebook computer, cold air 220 and cold air 230, to reduce the temperature of the CPU 130. In particular, the distribution rate of cold air 220 and 230 can be designed at a predetermined rate. For example, a preferred distribution rate of the cold air is about 70%–80% fresh air directly from the outside of the notebook computer and about 20%–30% from the inside of the notebook computer. The first heat exchanger 240 utilizes a heat sink, such as a fin-type heat sink, to absorb and dissipate the heat. The heat sink is made of a material with high thermal conductivity, such as copper or aluminum. The heat pipe 110 is also made of a material with high thermal conductivity, such as copper or aluminum. A preferred material of the heat pipe 110 is copper.

Figure 3:
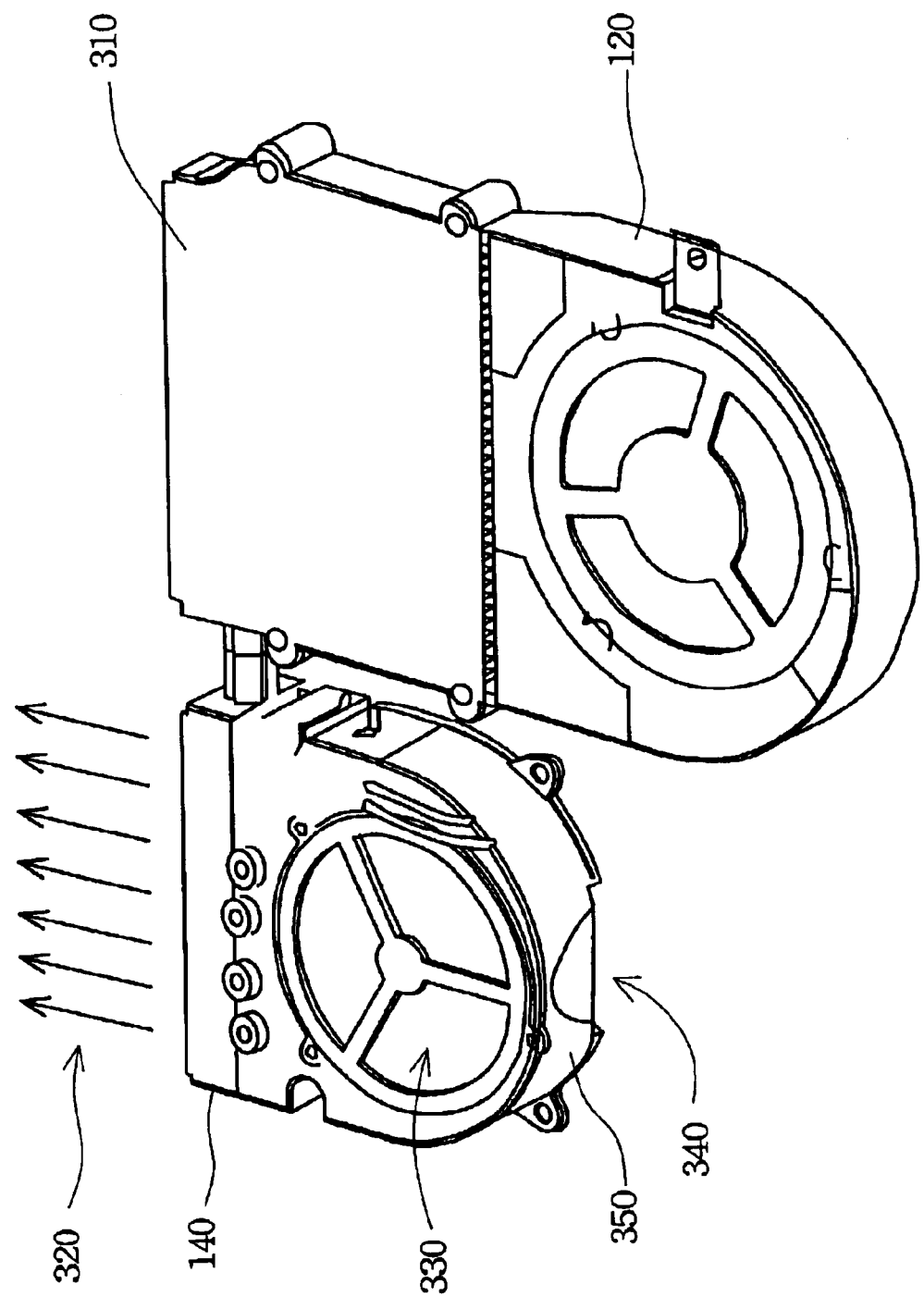
FIG. 3 is a detailed partial diagram of the apparatus in FIG. 1 with the first exchanger and a second heat exchanger according to the present invention.

FIG. 3 is a detailed partial diagram of the apparatus in FIG. 1 coupled with the first exchanger and a second heat exchanger according to the present invention. As previously described, the temperature of a desktop CPU is higher and sometimes the temperature rises very fast. The present invention uses the first heat exchanger 240 and first fan 120 to reduce the temperature to a normal temperature condition. If the temperature rises too fast or the heat power aggregates in the notebook computer too much, the second heat exchanger 140 and a second fan 350 start working. Therefore, the heat in the heat pipe 110 transfers to both the first heat exchanger 240 and the second heat exchanger 140. The first fan 120 and the second fan 350 blow the first heat exchanger 240 and second heat exchanger 140 to bring the heat out of the notebook. The heat is removed from the second heat exchanger 140 to the outside of the notebook computer via hot air 320. Accordingly, the temperature of the CPU is further reduced by the second heat exchanger 140 and second fan 350. Hence, the notebook computer with a desktop CPU works at a suitable temperature. The system of the notebook computer is more stable. As shown in FIG. 3, the second fan 350, such as a blower-type fan, is disposed behind the second heat exchanger 140 and coupled with the second heat exchanger 140. The embodiment according to the present invention further has a cover 310 to cover the first heat exchanger 240 to avoid the heat escaping directly from the first heat exchanger 240 to the inside of the notebook computer. The second fan 350 may also utilize a double-inlet air fan to draw the cold air 330 and the cold air 340 at a predetermined distribution rate from the inside and the outside of the notebook computer. For example, the preferred distribution rate is 20%–30% from the inside of the notebook computer and 70%–80% directly from the outside of the notebook computer. The second heat exchanger 140 comprises a heat sink, such as a fin-type heat sink, to absorb and dissipate the heat. The heat sink is also made of the material with high thermal conductivity, such as copper or aluminum.

The present invention utilizes two heater exchangers, two fans and only one heat pipe to reduce the temperature inside a notebook computer, and in particular to reduce the temperature of a desktop CPU used in a notebook computer. The notebook computer with a desktop CPU is more stable and the quantity of the expensive heat pipe is reduced. Furthermore, the first heat exchanger is directly on the CPU and the second exchanger works when the internal temperature is higher than a predetermined temperature. Heat is more efficiently removed from inside the notebook computer.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A heat dissipation apparatus for a notebook computer with a central processing unit, the heat dissipation apparatus comprising:

a heat pipe mounted on the central processing unit for absorbing heat produced by the central processing unit;

a first heat exchanger coupled with the heat pipe, wherein the first heat exchanger disposed on the central processing unit to absorb a part of the heat from the heat pipe;

a first fan coupled with the heat pipe and the first heat exchanger, and the first fan disposed behind the heat pipe and the first heat exchanger to blow the first heat exchanger and take a first part of the heat out of the notebook computer;

a second heat exchanger coupled with the heat pipe to absorb a second part of the heat from the heat pipe; and a second fan coupled with the second heat exchanger, and the second fan disposed behind the second heat exchanger to blow the second heat exchanger and take the second part of the heat out of the notebook computer.

2. The heat dissipation apparatus of claim 1 wherein the first heat exchanger comprises a heat sink.

3. The heat dissipation apparatus of claim 1 wherein the first heat exchanger is made of the material with high thermal conductivity.

4. The heat dissipation apparatus of claim 1 wherein the second heat exchanger comprises a heat sink.

5. The heat dissipation apparatus of claim 1 wherein the second heat exchanger is made of the material with high thermal conductivity.

6. The heat dissipation apparatus of claim 1 wherein the first fan comprises a plurality of inlets.

7. The heat dissipation apparatus of claim 1 wherein the second fan comprises a plurality of inlets.

8. The heat dissipation apparatus of claim 1 wherein the heat pipe is made of the material with high thermal conductivity.

9. A heat dissipation apparatus for a notebook computer with a desktop central processing unit, the heat dissipation apparatus comprising:

a heat pipe mounted on the desktop central processing unit for absorbing heat produced by the desktop central processing unit;

a first fin-type heat sink coupled with the heat pipe, wherein the first fin-type heat sink disposed directly on the desktop central processing unit to absorb a part of the heat from the heat pipe;

a first blower-type fan disposed behind the heat pipe and the first fin-type heat sink to blow the first fin-type heat sink and take a first part of the heat out of the notebook computer, wherein the first blower-type fan comprises a plurality of inlets to intake first cold air from inside and outside the notebook computer;

a second fin-type heat sink coupled with the heat pipe to absorb a second part of the heat from the heat pipe; and a second blower-type fan disposed behind the second fin-type heat sink to blow the second fin-type heat sink and take the second part of the heat out of the notebook computer, wherein the second blower-type fan comprises a plurality of inlets to intake second cold air from inside and outside the notebook computer.

10. The heat dissipation apparatus of claim 9 wherein the heat pipe is made of a high thermal conductivity material.

11. The heat dissipation apparatus of claim 9 wherein the first fin-type heat sink is made of copper.

12. The heat dissipation apparatus of claim 9 wherein the second fin-type heat sink is made of copper.

13. The heat dissipation apparatus of claim 9 wherein the first blower-type fan intakes about 20% to 30% of the first cold air from inside the notebook computer.

14. The heat dissipation apparatus of claim 9 wherein the first blower-type fan intakes about 70% to 80% of the first cold air from outside the notebook computer.

15. The heat dissipation apparatus of claim 9 wherein the second blower-type fan intakes about 20% to 30% of the second cold air from inside the notebook computer.

16. The heat dissipation apparatus of claim 9 wherein the second blower-type fan intakes about 70% to 80% of the second cold air from outside the notebook computer.

17. A heat dissipation apparatus for a notebook computer with a central processing unit, the heat dissipation apparatus comprising:

a heat pipe mounted on the central Processing unit for absorbing heat produced by the central processing unit;

a first heat exchanger coupled with the heat pipe, wherein the first heat exchanger disposed on the central processing unit to absorb a part of the heat from the heat pipe;

a first fan coupled with the heat pipe and the first heat exchanger, and the first fan disposed behind the heat pipe and the first heat exchanger to blow the first heat exchanger and take a first part of the heat out of the notebook computer, wherein the first fan intakes about 20% to 30% of the first cold air from inside the notebook computer and about 70% to 80% of the first cold air from outside the notebook computer;

a second heat exchanger coupled with the heat pipe to absorb a second part of the heat from the heat pipe; and a second fan coupled with the second heat exchanger, and the second fan disposed behind the second heat exchanger to blow the second heat exchanger and take the second part of the heat out of the notebook computer, wherein the second fan intakes about 20% to 30% of the second cold air from inside the notebook computer and about 70% to 80% of the second cold air from outside the notebook computer.

* * * * *